United States Patent Office

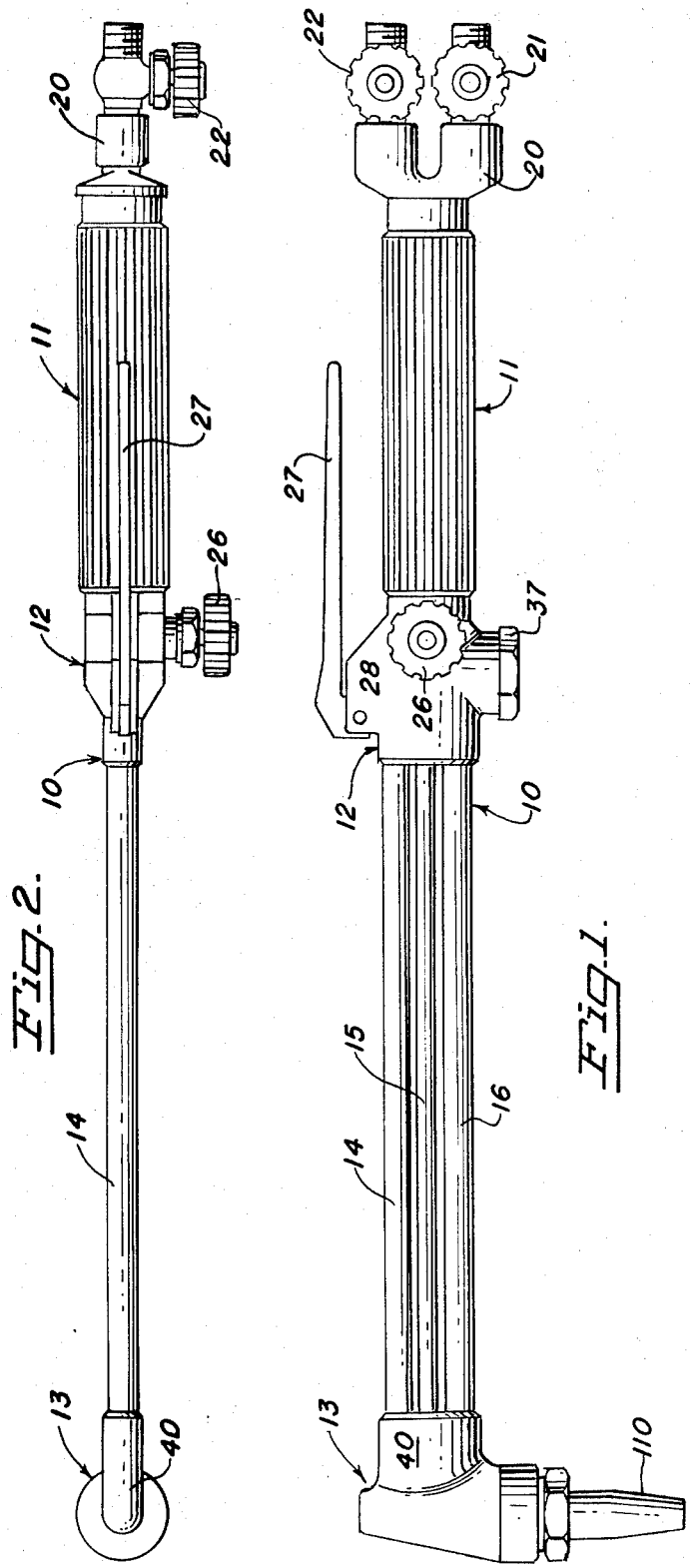

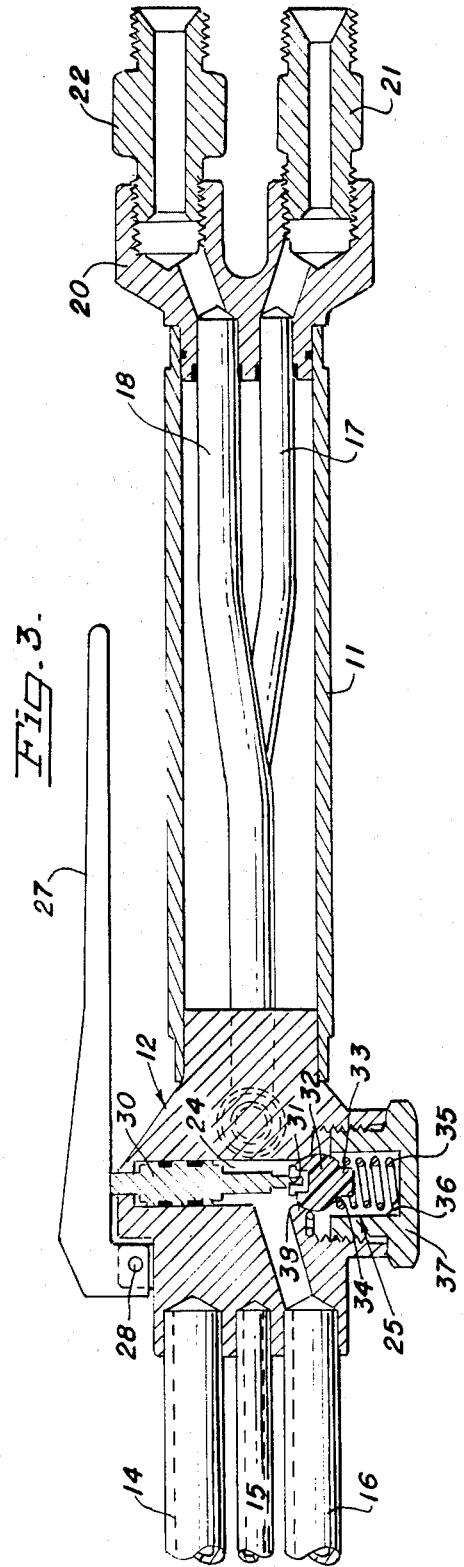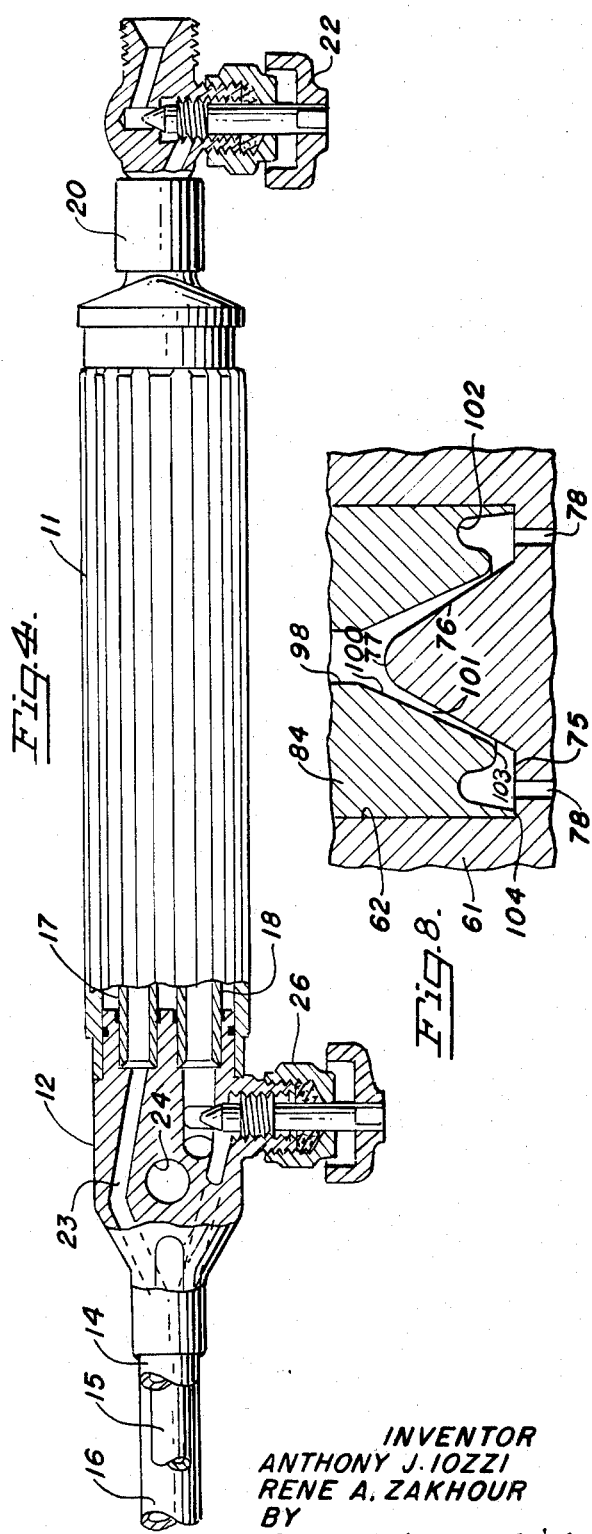

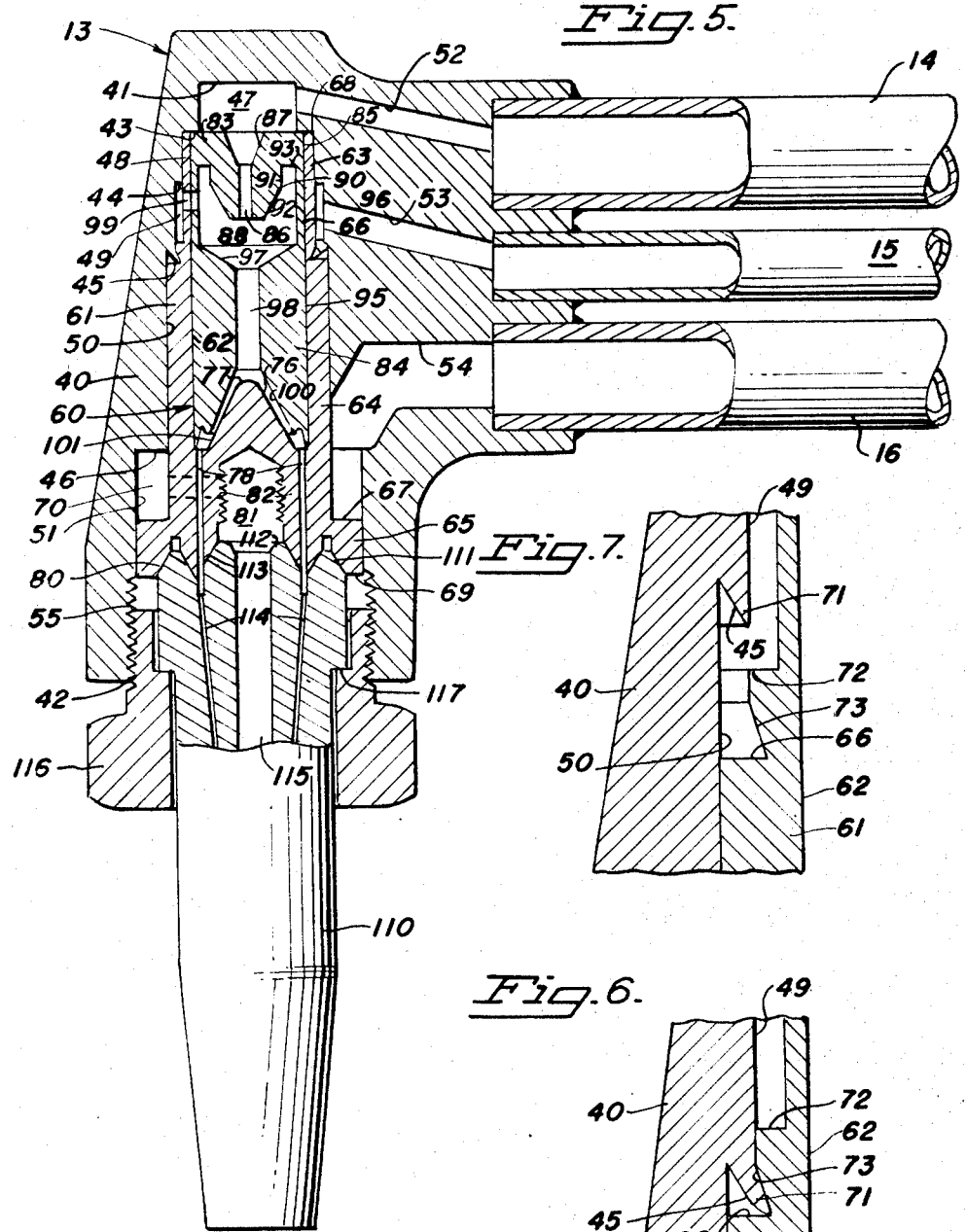

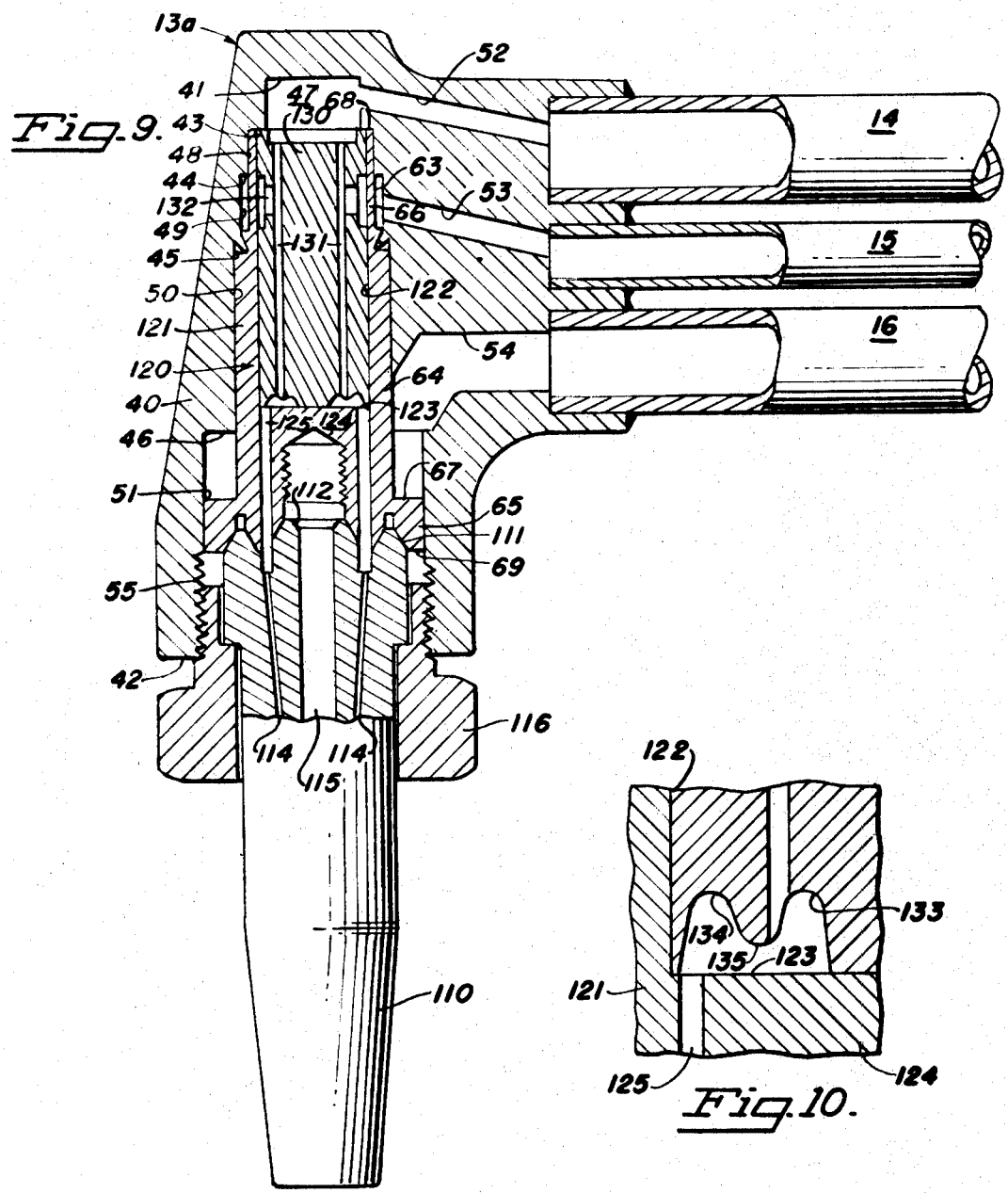

3,386,665
Patented June 4, 1968

3,386,665
GAS TORCH
Anthony J. Iozzi, Moraga, and Rene A. Zakhour, San Francisco, Calif., assignors to Veriflo Corporation, a corporation of California
Filed May 31, 1966, Ser. No. 554,193
15 Claims. (Cl. 239—416.1)

This invention relates to an improved gas torch for use in welding, cutting, and similar operations.

One severe problem with gas torches, whether of the propane (low-pressure gas) type or of the acetylene type, has been the danger and damage which occurs when there is flashback. Flashback usually results from the torch being brought too close to the workpiece or from the superheating of fuel gases to ignition temperatures; for example, if the torch is placed substantially against a piece of metal, the flow of gas from the torch is blocked and the gas tends to carry the flame and heat back into the torch, extinguishing the flame. The concomitant explosion has heretofore usually caused damage to the torch, and sometimes has caused injury to the operator. Since flashing back is so dangerous, welders and burners have usually had to be very careful with their handling of torches.

An object of the present invention is to provide a torch in which there is no danger of flashback. The torch is provided with a structure that employs the gas flow itself in preventing dangerous flashback. The torch of this invention can be placed directly against or even pushed into a block of wood or of hot metal or stuck directly into molten metal, all without flashback. Heretofore, a part of the torch usually had to be replaced after flashback, causing trouble and expense, but in the present invention there is no damage whatever, and the operator can continue using his torch. The invention thereby makes it possible for relatively unskilled operators to perform safely and achieve better results than they could heretofore.

Another problem solved by this invention relates to the use of different types of gases at different gas pressures. Somewhat different equipment is required with acetylene than with propane, and heretofore this has usually meant a complete change of the inner components. In the present invention, the same torch can be used for propane and for acetylene by simply replacing the torch tip and mixer assembly, which can be readily replaced in the present invention. This gives added versatility to the equipment.

It is important when having such replaceable equipment to provide an adequate gas seal, and the present invention solves this problem, too, by providing metal-to-metal seals that are completely safe and tight and yet are easily disengaged for interchange or replacement of parts.

Another problem heretofore met (particularly in the low-pressure gases, such as propane, butane and natural gas) is that changes in pressure conditions have caused difficulties and have often required the use of different mixer assemblies to accommodate changes over even a fairly narrow range of pressures. In the present invention, a novel venturi structure accommodates a wide range of gas pressures and assures complete and proper mixing of the gases over this wide range. Thus, a single assembly, without replacing the torch or the mixer assembly, can be used for the whole pressure range of the low-pressure gases, say, for example, over a range of 4 ounces to 12 p.s.i.

Another problem with prior-art torches has been in the poppet valve which is used to turn on and off and to regulate the flow of the high-pressure oxygen. The user operates in this manner: at all times, when the torch is on, he has a pre-heat oxygen flow and a fuel gas flow, the fuel gas being acetylene in some instances, propane in others, and so on. When the plate or steel reaches its kindling temperature so that it is ready to be cut, he presses a handle, which operates the poppet valve, to cause high-pressure oxygen to flow, thereby chemically oxidizing the steel or material being severed. Heretofore, these poppet valves have been very difficult to use because the pressure of the oxygen caused different actuating forces. They have been difficult to operate, thereby requiring greater operator skill. In the present invention a novel structure enables the operator to work much more easily. In the prior-art valve the incoming fluid pressure added to the velocity pressure created across the surface of the poppet valve, and changed the handle load appreciably as the pressure changed. In the present invention, a spherical-segment poppet valve is used; it minimizes the change in the handle load, and enables the operator to vary the cutting pressure readily by feel and sight to obtain correct pressures, even though the operator has very little experience and a relatively low level of skill.

Other objects and advantages of the invention will appear from the following description of some preferred forms thereof.

In the drawings:

FIG. 1 is a view in side elevation of a torch embodying the principles of the invention.

FIG. 2 is a top plan view of the torch of FIG. 1.

FIG. 3 is an enlarged view in side elevation and in section of the poppet valve and handle portion of the apparatus of FIGS. 1 and 2.

FIG. 4 is an enlarged top plan view, partly in section, of the same portion of the apparatus as FIG. 3.

FIG. 5 is an enlarged view in side elevation and mostly in section of the torch head and mixer assembly, showing the embodiment used for low-pressure gases.

FIG. 6 is a greatly enlarged fragmentary view in side elevation of the metal-to-metal seal formed by the swaging action between the head and the mixer assembly.

FIG. 7 is a view similar to FIG. 6 showing the parts before assembly or just after separation.

FIG. 8 is an enlarged fragmentary view in section of the mixed gas restrictor orifice and baffle.

FIG. 9 is a view similar to FIG. 5 of the acetylene torch head and mixer assembly.

FIG. 10 is a view similar to FIG. 8 of the preheat orifice restrictor canal and baffle in the acetylene-type assembly of FIG. 9.

The torch 10 shown in FIGS. 1 and 2 includes a handle body 11, a valve body 12, and a head 13 connected to the valve body 12 by three conduits, namely, a fuel-gas conduit 15, a preheat oxygen conduit 14, and a high-pressure oxygen conduit 16. The inlet of each of these conduits 14, 15, 16 is at the valve body 12 while the outlet of each of them is at the torch head 13.

The elongated body portion 11 contains two conduits, a fuel-gas conduit 17 and an oxygen conduit 18 (see FIGS. 3 and 4). Both conduits 17 and 18 lead from a bifurcated inlet fitting 20 which is joined to a fuel-gas flow-control valve 21 and an oxygen inlet fitting valve 22. The fuel-gas conduit 17 is connected to a passage 23 in the valve body 12, which leads directly to the conduit 15. The oxygen conduit 18 is connected to a passage 24 in the valve body 12, where there is a poppet valve assembly 25 (FIG. 3) embodying the principles of this invention. A portion of the oxygen bypasses the poppet valve 25 and flows to a flow control valve 26 (FIG. 4) which sends the low-pressure oxygen into the conduit 14. This flow is maintained at a constant level during use.

The poppet valve 25 normally completely cuts off the flow of oxygen from the conduit 18 to the conduit 16 but can be opened to enable flow at a varying rate, which depends on the position of an operating handle 27. The handle 27 is pivoted by a pin 28 to the valve body 12, and the operator is enabled by his hand pressure on it to depress a valve stem 30 (FIG. 3), the lower end of which fits into a recess 31 in a generally spherical poppet ball 32. This ball 32 is preferably made of tetrafluoroethylene and has a depending guide portion 33 surrounded by a shoulder 34, against which a spring 35 is urged. The opposite end of the spring 35 fits in a recess 36 in a cap 37, which is threaded into the body 12. The body 12 provides a seat 38 against which the spherical ball 32 normally seats, except when it is pushed away therefrom by depression of the handle 27 acting through the stem 30.

The generally spherical poppet 32 minimizes the effect of the incoming fluid pressure, due to the streamlined contour of the poppet. Since the pressure is the same on all faces to which the gas has access, the load on the handle 27 is not changed by the position of the valve 32. In other words, it takes the same amount of force to move the valve 32 a tenth of an inch in partially open position as it does to move it a tenth of an inch from the closed position. Therefore, it does not take great strength to operate the valve to get high pressure, and the operator, by merely flexing his hand, is able to obtain complete control.

The head 13, shown best in FIG. 5, preferably comprises a machined brass housing 40 having a coaxial series of cylindrical recesses or chambers connected by steps, the recesses widening in diameter successively from a dead end 41 to an interiorly threaded open end 42. There are four successive steps, a first step 43, a second step 44, a third step 45, and a fourth step 46, between the dead end 41 and the open end 42, as the passage gets successively wider to form five successive cylindrical chambers 47, 48, 49, 50 and 51.

The head housing 40 is also bored to provide a first passage 52 leading from the low-pressure oxygen conduit 14 into the first chamber 47 adjacent the dead end 41, a second passage 53 connecting the fuel-gas conduit 15 with the third cylindrical chamber 49, and a third passage 54 leading into the fifth chamber 51. The outlet portion of the chamber 51 is threaded.

Into the housing 40 fits a removable mixer assembly, which may be either a mixer assembly 60 for low-pressure gases (FIG. 5) or a mixer assembly 120 for acetylene gas in the head 13a (FIG. 9). The mixer assembly 60 includes an outwardly stepped body 61 providing a deep cylindrical recess 62. The outer surface of the body 61 has three successively wider cylindrical portions 63, 64, and 65 joined by successive shoulders 66 and 67. An inner end wall 68 of the body 61 seats against the first step 43 of the housing 40, and an outer end wall 69 terminates in the chamber 51 adjacent the inner end of the threads 55. The first shoulder 66 of the body 61 abuts on the third step 45 of the housing 40, and the second shoulder 67 is spaced from the fourth step 46 to provide an annular recess 70 connected with the third conduit 16 and receiving the high-pressure oxygen.

An important feature of the invention is the assembly between the body 61 and the housing 40. For this purpose, the third step 45 of the housing 40, instead of being provided with a flat radial shoulder, is undercut to provide an annular spur 71 (see FIGS. 6 and 7) which can be swaged outwardly by pressure. The body 61 is provided not only with the flat shoulder 66 but also with a step 72 and a conical recess 73 undercutting the step 72 and located directly above the shoulder 66. The result is that when the parts are driven together from the position shown in FIG. 7 to the position shown in FIG. 6, the spur 71 is swaged in to the conical recess 73 and forms a very tight metal-to-metal seal. Upon this assembly, the spur 71 is restored to its initial shape.

The lower portion of the body 61 is shaped so that it will cooperate with an inner member 84 to provide a restrictor orifice venturi-type structure. This portion of the body 61 (see FIG. 8) has an annular flat shoulder 75 surrounding a conical upwardly extending projection 76 with a rounded upper end 77, the function of which is explained below. A plurality of axially extending passages 78 lead from the shelf 75 to and through the lower end 69 of the body 61. Also in the lower end 69 are an annular recess 80 provided with sloping walls and a central recess 81 connected by passages 82 with the recess 70, and serving to conduct the high pressure oxygen.

The mixer assembly 60 preferably includes two inner members 83 and 84 that fit into the recess 62 of the body 61.

The top or innermost member 83 has a cylindrical exterior wall 85 which fits snugly into the recess 62 and has a central axial passage 86 having a frustoconical inlet portion 87. This passage 86 conducts the preheat oxygen from the chamber 47 adjacent the dead end 41 into a mixing chamber 88 at the lower end of the member 83. The member 83 has a lower central projecting portion 90 with a cylindrical wall portion 91 and a lower frustoconical wall portion 92, surrounded by a flat ledge 93 at the upper end.

The second inner member 84 has a cylindrical outer wall 95 fitting snugly in the recess 62 and provided with a thin shell 96 at its upper end, terminating against the ledge 93 of the member 83 and connected by a frustoconical shelf 97 to a central axial passageway 98. The shell 96 and the portion 63 of the body 61 are perforated by a radial passage 99 connecting with the passage 53 for fuel gas. Thus, in the chamber 88, the fuel gas and low-pressure oxygen are mixed by aspiration and flow into the passageway 98.

The central axial cylindrical passageway 98 leads to an outwardly flared frustoconical wall 100 at the lower end cooperating with the cone 76 to form a venturi, with a gradually narrowing passage 101 which raises the pressure of the gas as it approaches the narrow passage. The lower end of the member 84 terminates in a configuration that provides an annular rounded groove 102 (see FIG. 8) joined by a rounded projection 103 to the frustoconical wall 100, while a lower end 104 lies against a flat upper end wall 75 of the body 61. The angle of the cone 76 of the body 61 and of the frustoconical wall 100 of the lower member 84 are different, so that they converge toward the groove 102, and this means that the passage 101 of the restrictor orifice is narrowest adjacent the groove 102. The groove 102 acts as a baffle at any time when there is a tendency to flash back. This will be explained more fully after completing the description of the assembly.

A torch tip 110 fits against the lower end of the body 61, having an annular frustoconical projection 111 which fits in the frustoconical groove 80 and another frustoconical annular projection 112 fitting against a wall 113 of the recess 81 to provide metal-to-metal seals. The tip 110 has passages 114 with their upper ends aligned with the passages 78 and a central axial passage 115 aligned with the recess 81 for passage of the high-pressure oxygen therethrough.

The assembly is completed by a tightening nut 116 which bears against a shoulder 117 on the tip 110 and is threaded into the threads 55 of the housing 40. The projections 111 and 112 bear against the frustoconical groove 80 and wall 113, and the nut 116 thereby forces the mixer body 61 into position and forms the metal-to-metal seal between the spur 71 and the wall 73, while the body 61 also bears against the inner members 83 and 84 and forces them up into position. When the nut 116 is tightened, the swedging action referred to in FIGS. 5 and 6 takes place, and everything is aligned.

During operation, the flow of total oxygen and of the fuel gas are set by the valves 21 and 22 and usually remain constant for any one time of use, as does the valve 26 for the preheat oxygen which always supplies a burning flame. During welding or cutting, high-pressure oxygen is inected into the stream by depressing the handle 27 so that at the tip 110 it is mixed with the mixture of gas and preheat oxygen to give a very hot flame.

If there should be any tendency to backfire, the flame retreats up through the passages 114 and 78 until it approaches the baffle-like groove 102. At this point, the pressure of the gas flowing up is dispersed and comes back against itself. Moreover, the restrictor orifice 101 assures that the pressure of the outflowing gas at the restrictor orifice 101 will always be greater than that of any backflowing gas. Consequently, the backfiring flame is snuffed off immediately and harmlessly at the groove 102. The tight metal-to-metal seals provided by the structure and the gas-flow arrangement to the venturi take care of safety and also provide for a wide range of usable pressures.

For acetylene, the torch head 13a shown in FIG. 9 is used. The housing 40, tip 110, and nut 116 are the same but a modified form of mixer assembly 120 is empoloyed. The assembly 120 has a body 121 whose outer wall is the same as that of the body 61, but the inner portion is different. It has a cylindrical axial passage 122 which terminates at a flat wall 123 of a lower portion 124 having non-central axially extending passages 125.

A single inner member 130 may be a machined rod provided with a plurality of mixing passages 131 which lead from the chamber 47 to the wall 123 and into which enter passages 132 for the fuel gas. The passages 131 lead down into a groove 133 at the lower end of the member 130 (see FIG. 10). This groove 133 is separated from a second annular groove 134 by a projecting annular ridge 135, and the ridge 135 and grooves 133 and 134 act with the flat end 123 to provide a baffle which serves to snuff out any backfiring flame harmlessly at that point. There is no venturi of the type in the mixing gas before, back pressure being sufficient just by the passage of the gas by the groove 133 and ridge 135.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A gas torch, including in combination
   body means providing a fuel gas conduit, a preheat oxygen conduit, and a high pressure oxygen conduit, each said conduit having an inlet and an outlet,
   valve means for controlling the flow of fuel gas into said fuel gas conduit,
   valve means for controlling the flow of oxygen into said preheat oxygen conduit,
   poppet valve means for controlling the flow of oxygen into said high pressure oxygen conduit,
   a torch head having a main stepped opening providing a series of cylindrical recesses connected by steps, said recesses widening in diameter successively from a dead end in said head to an interiorly threaded open end and providing first, second, third and fourth steps from said dead end to said open end, and first, second, third, fourth, and fifth successively wider said cylindrical recesses from said dead end to said open end, said head having a first passage leading from the outlet from said preheat oxygen conduit into said first chamber adjacent said dead end, a second passage leading from the outlet from said fuel gas conduit into said third recess, and a third passage leading into said fifth recess.
   a mixer assembly in said main stepped opening, comprising a stepped body provided with axially extending passage means therein and providing first, second, and third successively wider cylindrical body portions joined by first and second shoulders, said stepped body having an inner end wall seating against said first step, and an outer wall terminating adjacent said fourth step, with said first shoulder abutting on said third step and said second shoulder in said fourth recess and spaced from said fourth step to provide a first annular recess connected with said third passage, for receiving said high-pressure oxygen, said first recess connecting said first passage to said axially extending passage means, said mixer assembly having a radial passage connecting said second passage to said axially extending passage means via a second annular recess between said second recess and said first body portion, for mixing of said fuel gas and said preheat oxygen, said mixer also having mixing means therefor in said axially extending passage means, said mixer further having in said third body portion a central axial passage separated from said axially extending passage means, which lies radially outwardly therefrom at that location, and connected to said first annular recess,
   a torch tip abutting said mixer assembly and having a central axial passage connected to the central axial passage of said mixed assembly and an axially extending passage means connected to the axially extending passage means of said mixer assembly, and
   a holding nut bearing on said torch tip which in turn bears on said mixer assembly and threaded into said threaded open end of said head, for tightening said torch tip and mixer assembly into said head.

2. The torch of claim 1 wherein said second step is provided with a sharp undercut to define a downwardly projecting annular spur on said body which said first shoulder engages, said mixer assembly having its said first body portion provided with an outwardly flaring recess just above said first shoulder, so that when said nut is tightened, it forces said spur to swage out into said flaring recess and provide a metal-to-metal seal at said first shoulder.

3. The torch of claim 1 wherein said mixer assembly is provided as part of said axially extending passage for the mixture of preheat oxygen and fuel gas with an outwardly stepped annular portion of that said passage wherein there is a rounded annular groove facing toward the torch tip, whereby when said torch is being used, said gas cannot flash back up past said groove, because said groove results in the gas being diverted against itself so that the outgoing gas pressure is always greater under all circumstances than any backflow gas pressure.

4. The torch of claim 3 wherein said axially extending passage on the inlet side of said groove is sent to said groove between two frusto-conical walls that converge toward said groove.

5. The torch of claim 3 wherein said axially extending passageway on the inlet side of said groove leads into a similar second groove concentric with the first named said groove.

6. The torch of claim 1 wherein said poppet valve comprises a movable member with a generally spherical surface on that part against which gas flows and a seat against which a part of the spherical segment seats.

7. A gas torch, including in combination
   a torch head body having a main stepped opening providing a series of cylindrical recesses connected by steps, said recesses widening in diameter successively from a dead end in said head to an interiorly threaded open end and providing first, second, third, and fourth steps from said dead end to said open end, and first, second, third, fourth, and fifth successively wider said cylindrical recesses from said dead end to said open end, said head having a first passage for preheat oxygen leading into said first chamber adjacent said dead end, a second passage for fuel gas leading into said third recess, and a third passage leading into said fifth recess,
   a mixer assembly in said main stepped opening, comprising a stepped body provided with axially extending passage means therein and providing first, second and third successively wider cylindrical body portions joined by first and second shoulders, said stepped body having an inner end wall seating against said first step, and an outer wall terminating adjacent said fourth step, with said first shoulder abutting on said third step and said second shoulder in said fourth recess and spaced from said fourth step to provide a first annular recess connected with said third passage for receiving high-pressure oxygen, said first recess connecting said first passage to said axially extending passage means, said mixer assembly having a radial passage connecting said second passage to said axially extending passage means via a second annular recess between said second recess and said first body portion, for mixing of said fuel gas and said preheat oxygen, said mixer also having mixing means therefor in said axially extending passage means, said mixer further having in said third body portion a central axial passage separated from said axially extending passage means, which lies radially outwardly therefrom at that location, and connected to said first annular recess, and a torch tip abutting said mixer assembly and having a central axial passage connected to the central axial passage of said mixer assembly and an axially extending passage means connected to the axially extending passage means of said mixer assembly.

8. The torch of claim 7 wherein said second step is provided with a sharp undercut to define a downwardly projecting annular spur on said body which said first shoulder engages, said mixer assembly having its said first body portion provided with an outwardly flaring recess just above said first shoulder, so that tightening of said tip into said head body forces said spur to swage out into said flaring recess and provide a metal-to-metal seal at said first shoulder.

9. The torch of claim 7 wherein said mixer assembly is provided as part of said axially extending passage for the mixture of preheat oxygen and fuel gas with an outwardly stepped annular portion of that said passage wherein there is a rounded annular groove facing toward the torch tip, whereby when said torch is being used, said gas cannot flashback up past said groove, because said groove results in the gas being diverted against itself so that the outgoing gas pressure is always greater under all circumstances than any backflow gas pressure.

10. The torch of claim 9 wherein said axially extending passage on the inlet side of said groove is sent to said groove between two frustoconical walls that converge toward said groove.

11. The torch of claim 9 wherein said axially extending passageway on the inlet side of said groove leads into a similar second groove concentric with the first named said groove.

12. A gas torch, including in combination a torch head having a main stepped opening providing a series of successively wider cylindrical recesses connected by steps, extending from a dead end to an interiorly threaded open end, said head having a first passage for preheat oxygen leading into said head adjacent said dead end, and a second passage for fuel gas leading into a subsequent recess, a mixer assembly in said main stepped opening, comprising a stepped body provided with a first central axially extending passage means therein and providing successively wider cylindrical body portions joined by shoulders, said stepped body having an inner end wall seating against the step in said head closest to said dead end, one said shoulder being spaced from one said step to provide an annular recess for receiving high-pressure oxygen, said mixer assembly having a radial passage connecting said second passage to said first central axially extending passage means, for mixing of said fuel gas and said preheat oxygen, said mixer also having mixing means therefor in said first central axially extending passage means said first central axially extending passage means branching into annularly distributed axially extending passage means downstream of said mixing means, said mixer further having a second central axial passage separated from said annularly distributed axially extending passage means, which lie radially outwardly therefrom at that location, and a torch tip abutting said mixer assembly and having a central axial passage connected to the central axial passage of said mixer assembly and an axially extending passage means connected to the axially extending passage means of said mixer assembly.

13. The torch of claim 12 wherein one said step is provided with a sharp undercut to define a downwardly projecting annular spur on said body which one said shoulder engages, said mixer assembly having an outwardly flaring recess just above that said shoulder, so that when said torch tip is tightened into said head, it forces said spur to swage out into said flaring recess and provide a metal-to-metal seal at that said shoulder.

14. The torch of claim 12 wherein said mixer assembly is provided as part of said axially extending passage for the mixture of preheat oxygen and fuel gas with an outwardly stepped annular portion of that said passage, wherein there is a rounded annular groove facing toward the torch tip, whereby when said torch is being used, said gas cannot flashback up past said groove, because said groove results in the gas being diverted against itself so that the outgoing gas pressure is always greater under all circumstances than any backflow gas pressure.

15. The torch of claim 14 wherein said axially extending passage on the inlet side of said groove is sent to said groove between two frusto-conical walls that converge toward said groove.

References Cited

UNITED STATES PATENTS

| 1,701,211 | 2/1929 | Muscills | 239—414 |
| 1,709,886 | 4/1929 | Smith et al. | 239—414 |
| 2,335,330 | 11/1943 | Wigton | 158—27.4 X |
| 2,476,777 | 7/1949 | Smith | 239—413 X |
| 2,528,916 | 1/1951 | Rudolph | 158—27.4 |
| 3,299,939 | 1/1967 | Marra | 158—27.4 |

M. HENSON WOOD, Jr., *Primary Examiner.*

V. M. WIGMAN, *Assistant Examiner.*

UNITED STATES PATENT OFFICE
CERTIFICATE OF CORRECTION

Patent No. 3,386,665

June 4, 1968

Anthony J. Iozzi et al.

It is certified that error appears in the above identified patent and that said Letters Patent are hereby corrected as shown below:

Column 4, line 73, "inected" should read -- injected --. Column 5, line 16, "empolyed" should read -- employed --. Column 6, line 19, "mixed" should read -- mixer --. Column 8, line 52, "Muscills" should read -- Muscillo --; line 56, "2,528,916" should read -- 2,538,916 --.

Signed and sealed this 6th day of January 1970.

(SEAL)

Attest:

Edward M. Fletcher, Jr.
Attesting Officer

WILLIAM E. SCHUYLER, JR.
Commissioner of Patents